(12) United States Patent
Blowers et al.

(10) Patent No.: US 9,898,041 B2
(45) Date of Patent: Feb. 20, 2018

(54) MODULAR DOCKING STATION

(71) Applicant: Panasonic Manufacturing UK LTD, Cardiff (GB)

(72) Inventors: Robert Blowers, Cardiff (GB); Joseph Preece, Cardiff (GB); Darren Mong Hay, Cardiff (GB)

(73) Assignee: Panasonic Manufacturing UK LTD, Cardiff (GB)

( * ) Notice: Subject to any disclaimer, the term of this patent is extended or adjusted under 35 U.S.C. 154(b) by 28 days.

(21) Appl. No.: 14/881,891

(22) Filed: Oct. 13, 2015

(65) Prior Publication Data

US 2017/0102735 A1    Apr. 13, 2017

(51) Int. Cl.
*G06F 1/16* (2006.01)
*F16M 13/00* (2006.01)

(52) U.S. Cl.
CPC ........... *G06F 1/1632* (2013.01); *F16M 13/00* (2013.01)

(58) Field of Classification Search
CPC .... G06F 1/1632; G06F 1/1628; G06F 1/1679; B60R 11/0252
See application file for complete search history.

(56) References Cited

U.S. PATENT DOCUMENTS

| | | | | |
|---|---|---|---|---|
| 6,069,790 | A * | 5/2000 | Howell | G06F 1/1632 292/122 |
| 7,778,018 | B2 * | 8/2010 | Motoe | G06F 1/1632 235/41 |
| 8,965,302 | B2 * | 2/2015 | Tamatsu | H04M 1/06 455/550.1 |
| 9,145,715 | B2 * | 9/2015 | Carnevali | E05B 17/2038 |
| 9,160,826 | B2 * | 10/2015 | Kim | H04M 1/04 |
| 9,274,556 | B2 * | 3/2016 | Gallouzi | F16M 11/041 |
| 9,298,661 | B2 * | 3/2016 | Hamel | G06F 13/4081 |
| 9,371,959 | B2 * | 6/2016 | Kuchler | F16M 13/00 |
| 9,448,588 | B2 * | 9/2016 | Barnard | G06F 1/1626 |
| 9,473,607 | B2 * | 10/2016 | An | H04M 1/11 |
| 9,535,457 | B1 * | 1/2017 | Vier | G06F 1/1632 |
| 9,602,639 | B2 * | 3/2017 | Carnevali | H04M 1/0254 |
| 2009/0213536 | A1 * | 8/2009 | Lewandowski | G06F 1/1632 361/679.43 |

FOREIGN PATENT DOCUMENTS

| | | |
|---|---|---|
| GB | 2494694 | 3/2013 |
| WO | 2010018011 | 2/2010 |

\* cited by examiner

*Primary Examiner* — Hoa C Nguyen
*Assistant Examiner* — Christopher L Augustin
(74) *Attorney, Agent, or Firm* — Fogg & Powers LLC (57) ABSTRACT

The present invention relates to a docking station module for a computer docking station. The docking station module comprises a latching mechanism, the latching mechanism comprising a latch moveable between an unlatched position and a latched position, and a retainer moveable between a blocking position and an unblocked position. In the blocking position the retainer prevents movement of the latch to the unlatched position and in the unblocked position movement of the latch to the unlatched position is permitted. An actuator moves the retainer between the blocking and unblocked position. A connection surface is configured to enable the docking station module to be connected to a docking station cradle.

25 Claims, 6 Drawing Sheets

MODULAR DOCKING STATION

BACKGROUND

In recent years the range of mobile computers has developed into, for example, tablets, mobile clinical assistants and rugged tablet PCs. This type of mobile computer is typically smaller than a standard laptop or notebook computer, and unlike such computers, often does not have a screen that is hinged to the body of the device that includes the processor, hard-disk, keyboard and the like. Instead, such devices typically have either a fixed relationship between the keyboard and the screen, with the keyboard being provided on the same face of the device as the screen and/or such devices utilise a touch screen with an on-screen keyboard. Mobile computers, of this type also have a screen size in the range of 17.8 cm to 30.5 cm (7 to 12 inches). It is conventional for those computers to be referred to as tablet computers.

A mobile (tablet) computer may run using a full desktop operating system such as Windows® XP®, Vista®, Windows® 7 Professional, Windows® 8 or Linux. Examples of such mobile computers are a mobile clinical assistant or a rugged handheld tablet; for example, the Panasonic Toughbook® CF-D1, CF-H2 Field, CF-H2 Health handheld tablet PCs. Other mobile computers may be adapted to run a mobile operating system, for example iOS, Android, QNX, Palm OS. They may share a similar form factor, but have fewer connectivity options and have a lesser amount (typically) of flash memory.

A particular problem with mobile (tablet) computers of the type discussed, in particular those that are ruggedised, is how to securely hold them within a docking station in a potentially hostile environment such as in a hospital, in a manufacturing environment or in a moving vehicle and yet at the same time enable access to the keyboard and/or touchscreen and interface ports such as USB sockets, microphone and headphone sockets and expansion slots. A further complication with such devices is that they may be provided with a handstrap on their rear face that enables the mobile computer to be held securely in one hand while a user interacts with the keyboard, screen, etc. using their other hand. It is not desirable to remove the handstrap each time the mobile computer is docked. Therefore, it is particularly desirable to provide a docking station that holds the mobile computer with the hand strap in place, and yet ensures that the hand strap does not impede the insertion or removal of the mobile computer from the docking station.

Thus, docking stations for use with laptop computers are not suitable for use with mobile computers, particularly when rugged versions of mobile computers and docking stations are needed for operation outside of the office environment, such as for operation in hospitals, factory floors, vehicles and the like.

WO2010/018011 describes a docking station for a mobile computer that uses a two-step positioning procedure; the mobile computer is positioned in the docking station and then the mobile computer is secured.

GB2494694 describes a docking station for a mobile computer that uses a two-stage latching procedure, the docking station adapted to engage with a top handle portion of a tablet device.

SUMMARY

One embodiment of the present invention provides, according to a first aspect, a docking station module for a computer docking station, the docking station module comprising a latching mechanism, the latching mechanism comprising a latch moveable between an unlatched position and a latched position, a retainer moveable between a blocking position and an unblocked position, such that in the blocking position the retainer prevents movement of the latch to the unlatched position and in the unblocked position movement of the latch to the unlatched position is permitted, and an actuator for moving the retainer between the blocking and unblocked position, and a connection surface, the connection surface configured to enable the docking station module to be connected to a docking station cradle.

The docking station module may be configured to be removably connected to a docking station cradle. The docking station module may be a self-contained modular unit. The docking station module may comprise an external casing covering a number of internal mechanisms. In order to be removably connected to a docking station cradle, the docking station module may be connected to a docking station cradle such that the docking station module can be removed without having to take apart or otherwise alter the docking station cradle.

The docking station module according to one embodiment of the invention is configured such that it may be removably connected to variously sized docking station cradles. Therefore, the docking station module allows a docking station to be adapted to various different sized tablet computers by pairing the docking station module with an appropriately sized docking station cradle. Typically, in a docking station, the docking station module as described will be the most complex, and hence expensive, element of the docking station to manufacture. Therefore, by providing a modular docking station, with the docking station module removably attached to an appropriate docking station cradle, manufacturing costs may be reduced. In particular, manufacturing costs may be reduced in comparison to a docking station specifically designed for, and compatible with only one size and type of tablet computer. In such an arrangement, the docking station may require a complete redesign as a result of the dimensions of a tablet computer changing, for example in an updated version of a tablet computer, or in the case of a different type of tablet computer being used. Designing appropriate docking station cradles may be less complex and expensive than designing complete docking stations for each size and shape of tablet computer.

The retainer may be configured to block the motion of the latch.

The actuator may be positioned forward of the latch, such that a tablet computer first contacts the actuator and subsequently contacts the latch, when being brought into engagement with a docking station comprising the docking station module.

The actuator may be positioned to axially overlap the latch.

The actuator may comprise an inclined surface, the inclined surface arranged to be contacted by a computer when a computer is being engaged with a docking station comprising the docking station module.

The latch may be resiliently biased. The actuator may be pivotable about an axis of the latching mechanism, such that rotary movement of the actuator moves the retainer to the unblocked position. The latch may be pivotable about an axis of the latching mechanism, such that rotary movement of the latch moves the latch between the latched and unlatched position. The actuator may be pivotable about an axis of the latching mechanism, such that rotary movement of the actuator moves the retainer between the blocking and unblocked positions. The latch and the actuator may be pivotable about a common axis.

The docking station module may comprise a latch release button for moving the retainer to the unblocked position so as to permit movement of the latch to the unlatched position. The latch release button may be configured to move along a longitudinal axis of the docking station module.

The latching mechanism may be configured to engage with and restrict the movement of an external edge of a tablet computer.

The connection surface may be configured to engage with a docking station cradle, at an opposite portion of the docking station cradle to a computer connection point. The computer connection point may comprise an electrical connection and one or more data connections.

According to a second aspect of one embodiment of the invention there is also provided a docking station, the docking station comprising a docking station module and a docking station cradle, the docking station module comprising a latching mechanism comprising a latch moveable between an unlatched position and a latched position, a retainer moveable between a blocking position and an unblocked position, such that in the blocking position the retainer prevents movement of the latch to the unlatched position and in the unblocked position movement of the latch to the unlatched position is permitted, and an actuator for moving the retainer between the blocking and unblocked position, and a connection surface, the connection surface configured to enable the docking station module to be connected to a docking station cradle, the docking station module removably connected to the docking station cradle via the connection surface.

The docking station cradle may comprise a base support for receiving the base of a tablet computer. The docking station cradle may comprise a rear support for supporting the rear of a tablet computer engaged with the docking station. The base support may be arranged to be cupped, such that to place a tablet computer into engagement with the docking station, the base of the tablet computer is received in the base support and the tablet computer is tilted towards the actuator and the latch. The docking station cradle may comprise an electrical connection for connecting to the power supply of a tablet computer.

The docking station module may comprise a lock, the lock being lockable to prevent release of the latch.

The docking station cradle may be configured to be mounted in a vehicle. The docking station cradle may have a front face, configured to receive a computer, and a rear face configured to mount the docking station cradle to an external surface. The external surface may be part of a vehicle, or, for example, a wall in an office or hospital environment.

The removable connection between the docking station module and the docking station cradle may be facilitated by one or more of screws, nuts, bolts, clips, plugs, sockets, and/or slots.

According to a third aspect of one embodiment of the invention, there is also provided a docking station system, the docking station system comprising a docking station module, the docking station module comprising a latching mechanism comprising a latch moveable between an unlatched position and a latched position, a retainer moveable between a blocking position and an unblocked position, such that in the blocking position the retainer prevents movement of the latch to the unlatched position and in the unblocked position movement of the latch to the unlatched position is permitted, and an actuator for moving the retainer between the blocking and unblocked position, and a connection surface, the connection surface configured to enable the docking station module to be connected to a docking station cradle, a first docking station cradle, and a second, different docking station cradle, the first docking station cradle configured for connection to the docking station module via the connecting surface to provide a first docking station, and the second docking station cradle configured for connection to the docking station module via the connecting surface to provide a second, different, docking station.

Such a docking station system provides an easily adaptable docking station arrangement which may be configured for use with a variety of differently sized tablet computers. The first and second docking station cradles may be different in size. The first and second docking station cradles may be different in configuration, for example for connection to tablet computers with different electrical and data connectors.

According to a fourth aspect of one embodiment of the invention, there is provided a docking station cradle, the docking station cradle comprising a connecting surface, the connecting surface configured to mate with a connecting surface of a docking station module as described with reference to the first aspect of the invention.

According to a fifth aspect of one embodiment of the invention there is provided a method of manufacturing a docking station comprising the steps of: connecting a docking station module as described with reference to the first aspect of the invention to a docking station cradle as described with reference to the fourth aspect of the invention.

In one embodiment, the step of connecting the docking station module to the docking station cradle comprises removably connecting the two elements together. The method may comprise the step of selecting a suitably sized docking station cradle for the intended purpose of the docking station, and in particular the tablet computer with which the docking station cradle is intended to be used.

It will of course be appreciated that features described in relation to one aspect of the present invention may be incorporated into other aspects of the present invention. For example, the method of the invention may incorporate any of the features described with reference to the apparatus of the invention and vice versa.

DESCRIPTION OF THE DRAWINGS

Embodiments of the present invention will now be described by way of example only with reference to the accompanying schematic drawings of which.

DETAILED DESCRIPTION

Figure 1:
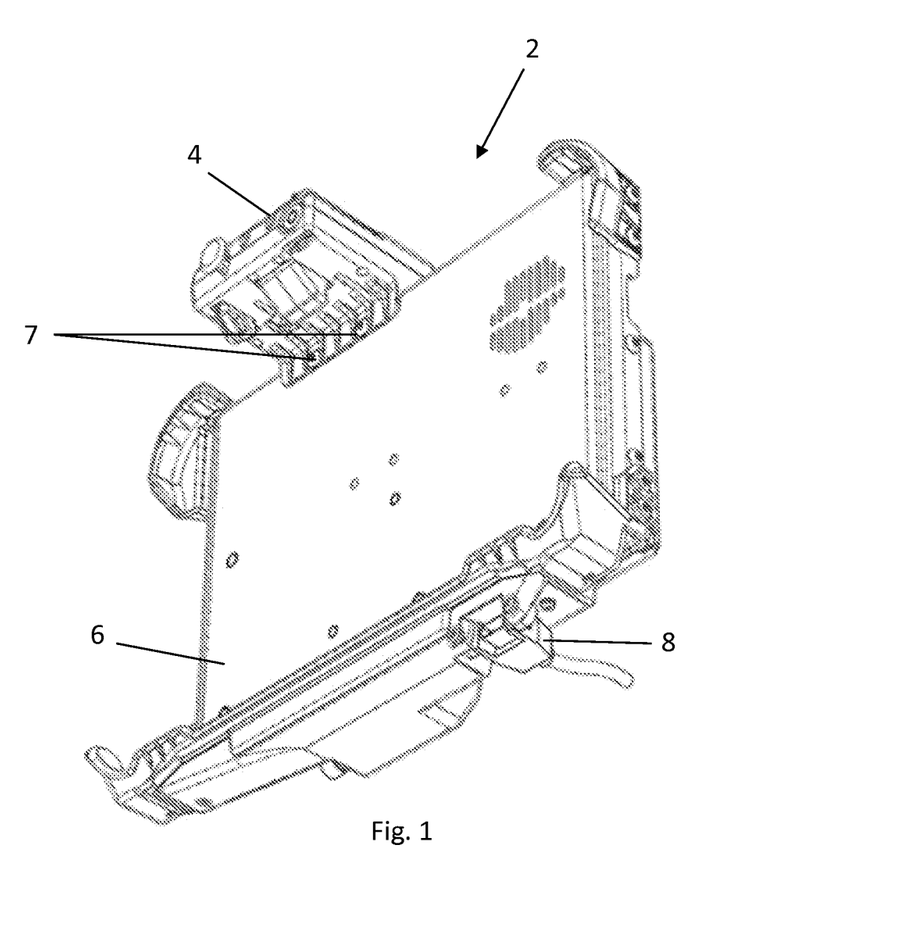
FIG. 1 shows a docking station comprising a docking station module and docking station cradle according to a first embodiment of the invention.

FIG. 1 shows a docking station 2 comprising a docking station module 4 and a docking station cradle 6. The docking station module 4 is removably connected to the docking station cradle 6. The docking station cradle 6 is connected to an external power supply at the connection point 8.

Figure 2:
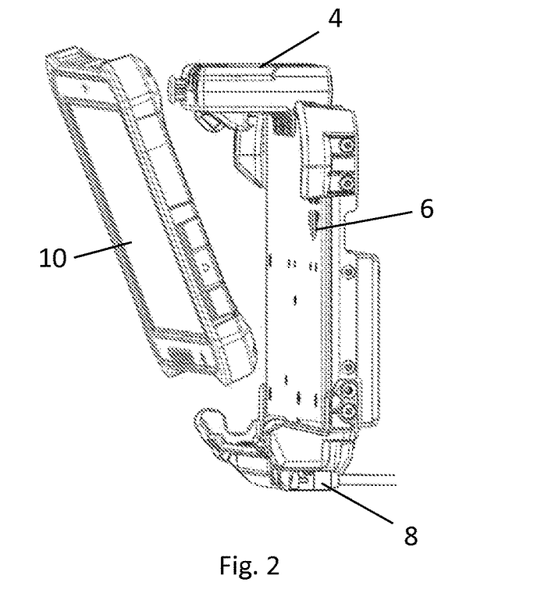
FIGS. 2, 3, and 4, show the docking station as shown in FIG. 1, with a tablet computer in various stages of being docked with the docking station.
Figure 3:
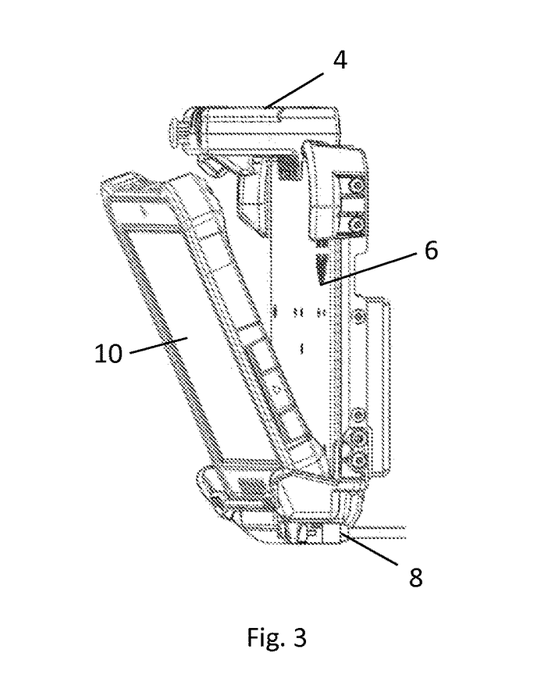
Figure 4:
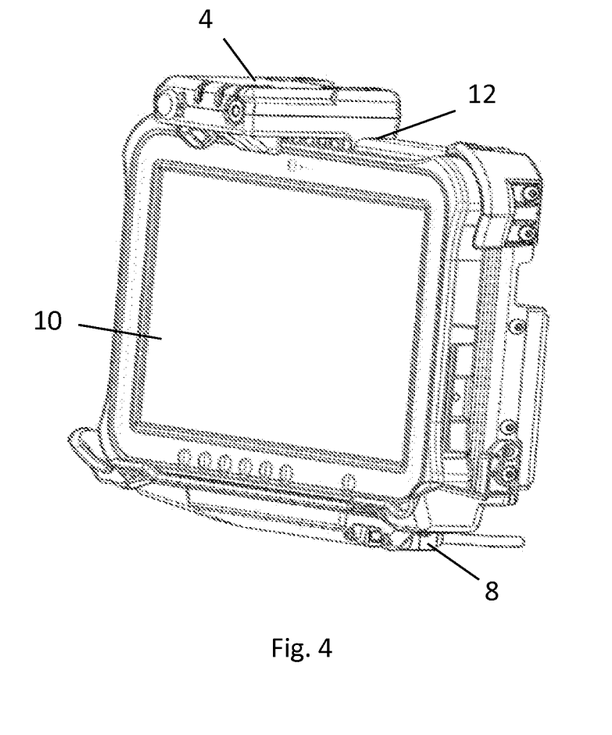

FIGS. 2, 3, and 4, show the process of docking a tablet computer 10 with the docking station 2. The tablet computer 10 is positioned at an incline with respect to the docking cradle 6, located with the bottom of the tablet engaging with a connector (not shown in FIGS. 2, 3, and 4) in a bottom portion of the docking station cradle 6, and the pivoted such that the top edge of the tablet computer 10 engages with the docking station module 10, as shown in FIG. 4. The connector engaging with the tablet computer 10 is mounted to the docking station cradle 6 with a degree of resilience, to allow a reliable connection to be made with the tablet computer 10, and also allow the tablet computer 10 to be pivoted into engagement with the docking station module 4 as described. Further details about the construction of the docking station module are found below, with reference to FIGS. 5, 6, and 7.

The docking station module 4 comprises a connection surface 12. The connection surface 12 is configured to conform to a connection point on the docking station cradle 6, such that when engaged with the docking station cradle 6, a flush connection is made. The connection surface is associated with one or more fixing elements for removably engaging the docking station module 4 with the docking station cradle 6. In this embodiment, two screws 7 fix the docking station module 4 to the docking station cradle 6, those screws extending through the docking station module 4, via the connecting surface 12, into the docking station cradle 6. Additional screws 9 also fix the docking station module 4 to the docking station cradle 6, those screws extending in a direction perpendicular to the screws 7. The skilled person will appreciate that any suitable connection means may be provided, such as nuts, bolts, clips, plugs, sockets, and/or slots.

Figure 5:
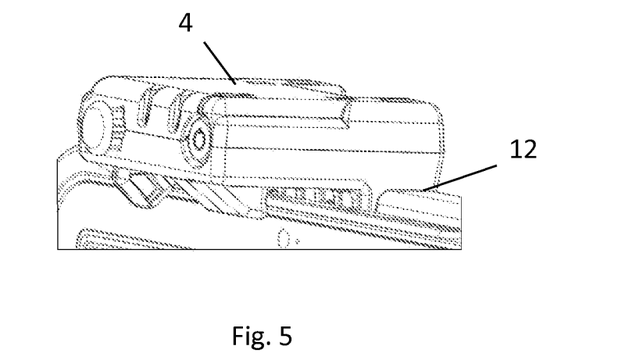
FIG. 5 shows a docking station module according to one embodiment of the invention.
Figure 6:
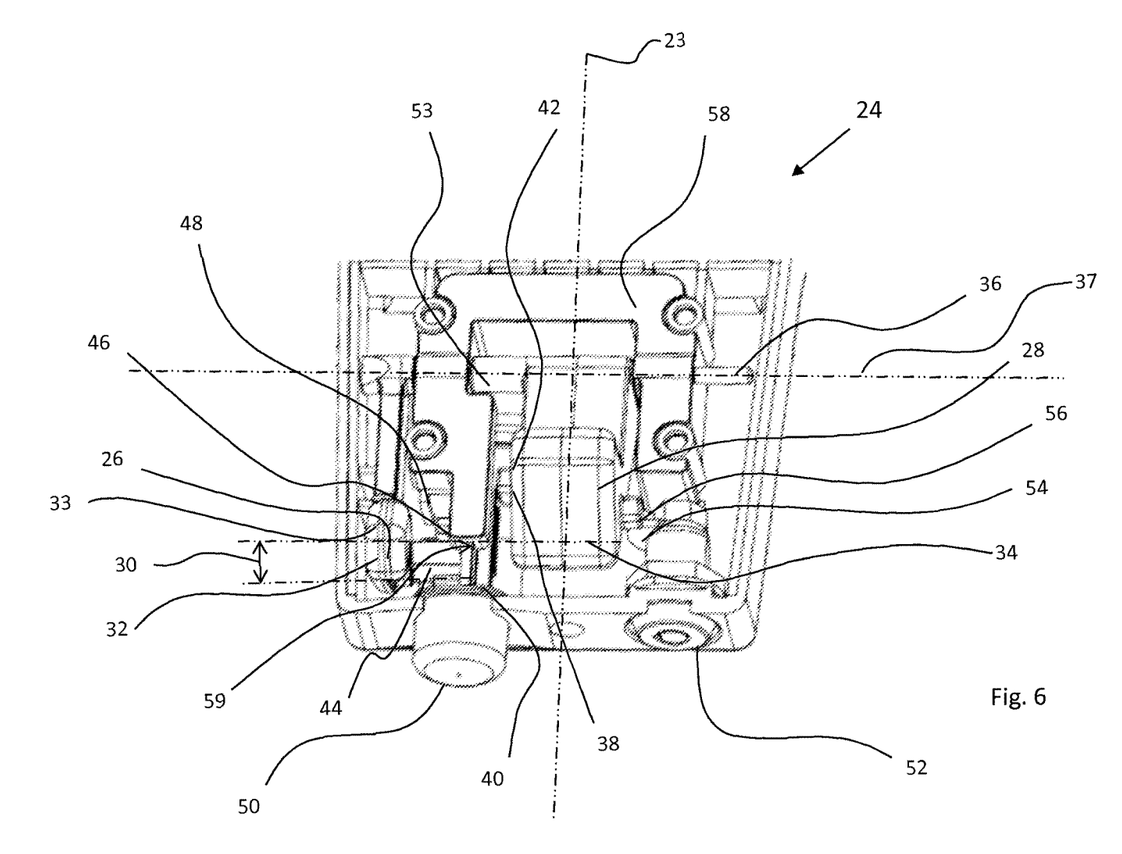
FIGS. 6 and 7 show a cutaway view of a docking station module.
Figure 7:
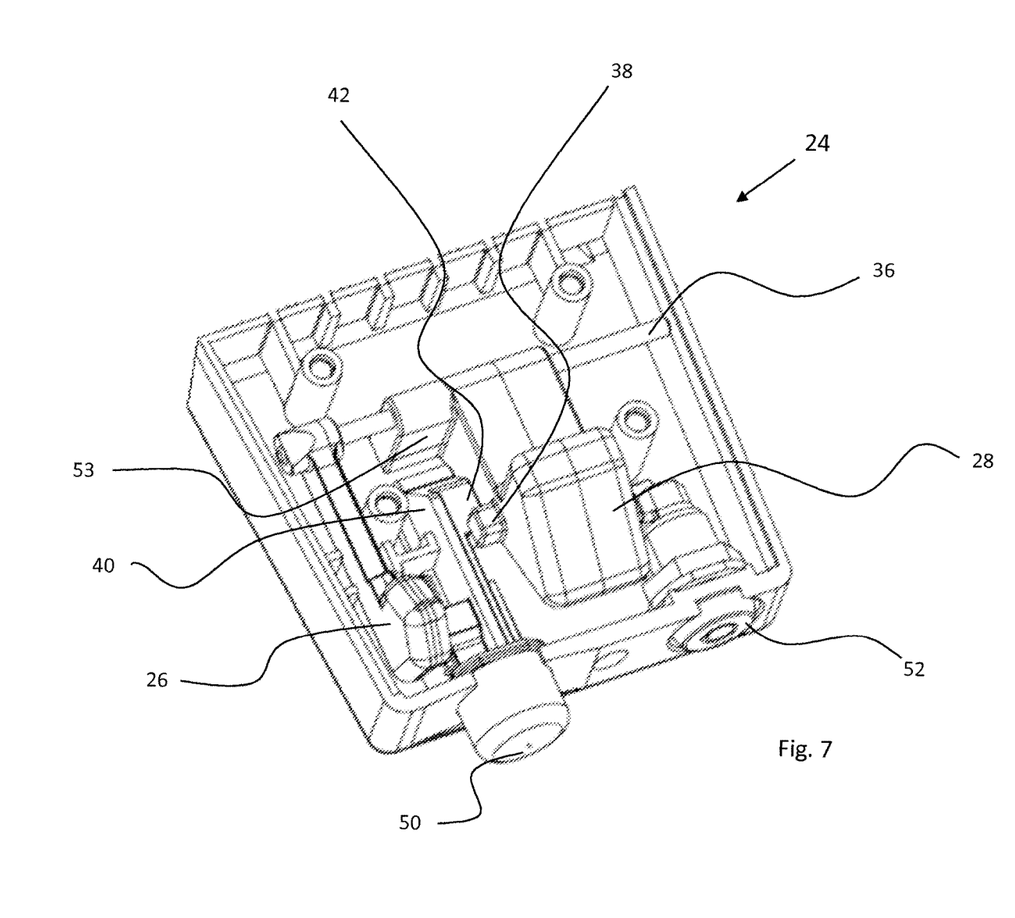

The docking station module 4 comprises a latching mechanism 24, with a protruding portion of an actuator 26 and a protruding portion of a latch 28 protruding towards the top edge of the tablet computer 10. In the embodiment shown, this means the actuator 26 and the latch 28 protrude downwardly towards the base of the docking station cradle 6. The actuator 26 is positioned such that the actuator is forward of the latch 28, but overlaps the latch 28 by a distance 30 in the axial direction, i.e. in the direction of the longitudinal axis 22 of the docking station module 4. Both the actuator 26 and the latch 28 have an inclined surface 32 and 34 respectively.

The latching mechanism contains a support structure 58 which provides rigidity and robustness of the latching mechanism 24. IN this example, the support structure 58 is n-shaped and arranged around the latch 28. Mounted in the support structure is an axle 36 arranged traversely to the longitudinal axis of the docking station module 4. The actuator 26 and the latch 28 are pivotally mounted to the axle 36 of the latching mechanism 24, so as to permit rotary movement of the actuator 26 and the latch 28 about an axis 37 defined by an axle 36 of the latching mechanism.

A retainer 40 has a second projection 44 that engages with the actuator 26. The second projection 44 that engages with the actuator 26 has an inclined surface which engages an inclined rear surface of the actuator 26. In this embodiment, a support structure 58 contains a channel 59 that guides the retainer 40 between the blocking position, where a first protrusion 38 is blocked by a first projection 42 of the retainer 40, and the unblocked position where the first projection 42 of the retainer 40 is positioned so as to permit movement of the first protrusion 38 and therefore permits movement of the latch 28.

A spring 46 is positioned between the second projection 44 of the retainer and a static component 48 of the latching mechanism 24, the spring biasing the latch 28 to the latched position shown in FIG. 4, and the spring biasing the retainer 40 to a blocking position that prevents movement of the latch 28 to an unlatched position.

A latch release button 50 is connected to the retainer 40 and is aligned with a longitudinal axis of the docking station module 4. The connection of the latch release button to the retainer 40 is such that the spring 46 biases the latch release button 50 to a position where the retainer 40 is preventing movement of the latch 28. Mounted on the axle 36 of the latching mechanism 24 and connected to the latch 28 is an abutment surface 53. The abutment surface 53 is arranged to extend downwardly from the axle 36 such that when the retainer 40 moves longitudinally in a direction of the longitudinal axis 23 of the guide arm 22, the abutment surface 53 is contacted by the retainer 40 and causes the latch 28 to rotate towards an unlatched position. The latch release button 50 is configured such that it can move the retainer 40 such that the retainer 40 contacts the abutment surface 53 and moves the abutment surface 53 so as to unlatch the latch 28.

In this embodiment, the latching mechanism 24 also has a lock 52. The lock 52 has a locking arm 54 which when rotated with a key engages a second protrusion 56 of the latch 28 so as to block movement of the latch 28 to an unlatched position. In the example shown in FIGS. 6 and 7, the lock 52 is positioned on the opposite side of the latch 28 to the latch release button 50, but in alternative embodiments, the lock 52 may be positioned on the same side as the latch release button 50 and/or may block movement of the retainer 40.

To place the tablet computer 10 into the docking station 2, the base of the mobile computer 10 is received in the base support of the docking station cradle 6 and tilted forward. The mobile computer 10 is then tilted towards the latching mechanism 24 (i.e. tilted backwards). As the tablet computer 10 is tilted the top edge of the tablet computer 10 contacts the inclined surface 32 of the actuator 26, and further tilting causes the actuator 26 to depress and rotate about an axis 37 defined by the axle 36 of the latching mechanism 24. The inclined surface 32 of the actuator means the actuator 26 is more easily rotated when contacted by the tablet computer 12, and the rotational movement of the actuator 26 further eases insertion of the mobile computer 12 in the docking station 2 because it permits the actuator 26 to generally follow the path of the tilting tablet computer 10.

As the actuator 26 rotates, the rear inclined surface of the actuator slides against the inclined surface of the second projection 44 of the retainer. The cooperation of these two inclined surfaces causes the retainer 40 to slide parallel to axis 23. The linear motion of the retainer 40 causes the first projection 42 of the retainer to move out of alignment with the first protrusion 38 of the latch 28, thus permitting movement of the latch 28.

With further tilting of the tablet computer 10, the top edge of the tablet contacts the latch 28, whilst the actuator 26 is depressed, and the top edge of the tablet progressively depresses the latch 28. As the latch 28 is depressed, the latch 28 rotates about the axis 37 defined by the axle 36 of the latching mechanism 24. The latch 28 is progressively depressed, and once the first protrusion 38 is in a position where it can no longer slide back, due to the contact of the latch 28 with the top edge of the tablet, the actuator 26 may cease to be depressed.

Further tilting of the mobile computer 10 causes the top edge of the tablet computer to ride fully over the latch 28.

Once the top edge of the tablet computer 10 is fully over the latch 28, the latch 28 then springs back to protrude from the guide arm and prevents forward tilting of the top edge of the tablet 10. The retainer 40 then slides back to a rest position, such that the first projection 42 is blocking the motion of the first protrusion 38. This positioning of the retainer 40 prevents the latch 28 from being unintentionally depressed.

Advantageously, the latching mechanism, as described, permits the mobile computer 10 to be placed in the docking station 10 by a user using only a single hand.

For security purposes, the lock 52 can be locked.

In this embodiment, the forward positioning of the latch 28 and the axial overlap 30 of the actuator 26 and latch 28 enables the latch 28 to be contacted whilst the actuator 26 is depressed. However, in other embodiments there may be no overlap 30, for example if the width of the top edge of the tablet computer is greater than the top edge of the tablet computer 10 of the present example. Again, similarly as for the actuator 26, the inclined surface and rotary motion of the latch 28 eases insertion of the tablet computer 10 in the docking station 2.

To remove the tablet computer 10 from the docking station 2, if the lock 52 is locked this is first unlocked. Then, the latch release button 50 is pressed. Pressing of the latch release button 50 causes the retainer 40 to move linearly in the same axial direction as the latch release button, which causes the first projection 42 of the retainer 40 to unblock the motion of the first protrusion 38 of the latch 28. Further, pressing of the latch release button causes an end of the retainer 40 to contact the abutment surface 53, causing the latch to pivot about the axis 37 defined by the axle 36, and move to the unlatched position.

The tablet computer 10 can then be tilted past the latch 28 and removed from the docking station 2. Contact of the top edge of the tablet computer 10 with an inclined surface 33 of the actuator 26 causes the actuator 26 to automatically depress. The provision of the latch release button 50 is advantageous because it permits the top edge of the mobile computer 10 to be grasped and the button depressed with one hand, allowing one handed removal of the tablet computer 10 from the docking station 2.

Figure 8:
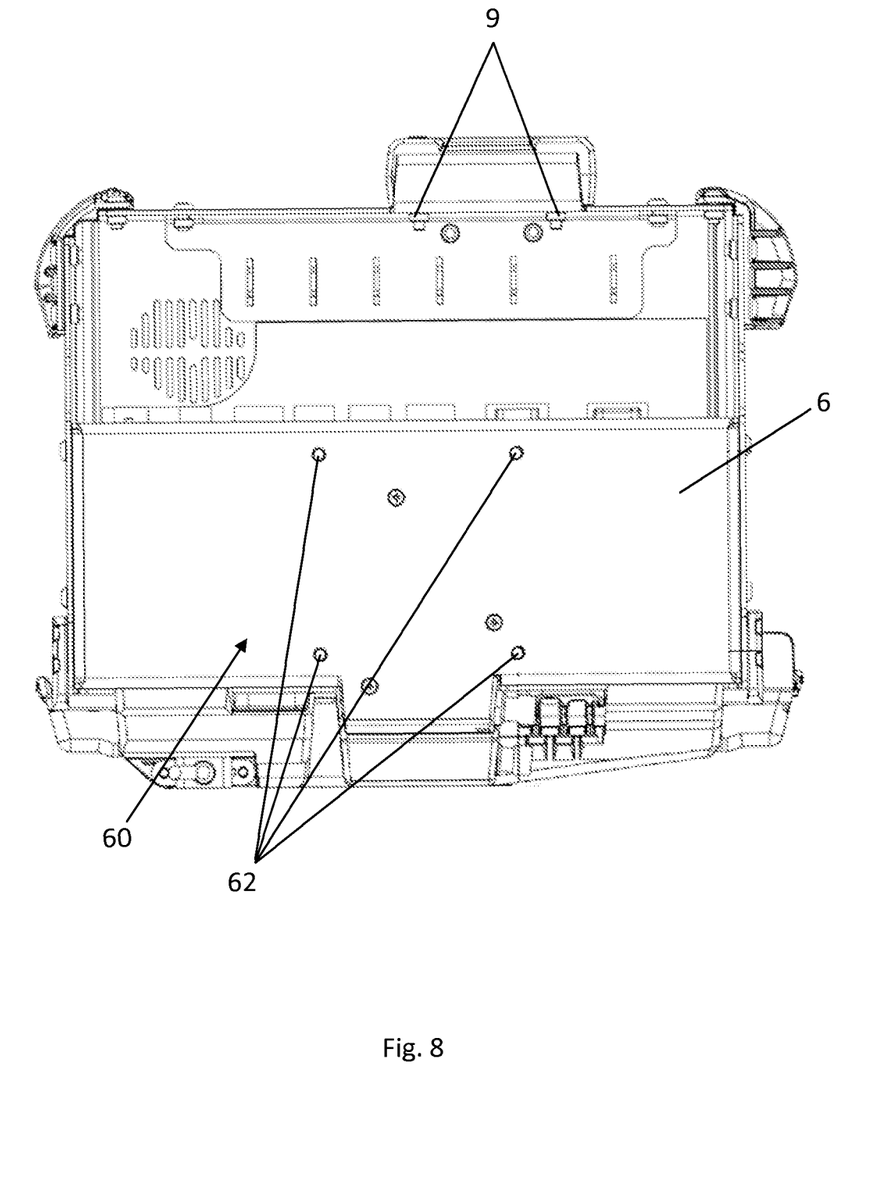
FIG. 8 shows the rear of the docking station cradle.

Referring to FIG. 8, the docking station cradle 6 can be mounted to a surface, for example a wall or vehicle, using mounting system 60. Mounting system 60 comprises a plurality of holes 62. In this example, different shaped holes 62 are in various positions on the mounting system 60 to permit the user to select an appropriate fastener and to select the appropriate holes to attach the mounting bracket to a particular surface.

Advantageously, the mounting system 60 can be attached to a surface independently of the docking station 2.

It should be understood by the skilled person that references such as front, rear, top and bottom, etc are used for illustrative purposes and should not be regarded as limiting.

In further alternative embodiments, the tablet computer may be secured within a docking station using the mechanism described above in a variety of other ways. For example, the tablet computer may be slid rather than tilted into the docking station having guide channels for the tablet computer, and the actuator and the latch may be positioned on a base support of the docking station; the tablet computer could then be slid along the base support of the docking station to an end stop, and in the latched position, the latch would latch over a side edge of the tablet computer.

In a further alternative embodiment, the base support may be replaced by a further latching mechanism, such that to place the tablet computer in the docking station, the tablet computer is inserted directly towards both latching mechanisms, and once in place the latch of each latching mechanism would be in the latched position and block removal of the tablet computer from the docking station. An optional adaptation to such embodiments, is for the docking station to have side walls to further support the tablet computer.

In further alternative embodiments, the latch, the actuator, and/or the release button may have alternative inter-lock configurations. For example, the protrusion/projection arrangement may be replaced by a cam and follower or a slot and pin arrangement. In another embodiment, there may be a rotational connection between the actuator and the latch or the connection between the actuator and latch could be modified to be a rack and pinion arrangement. In yet a further embodiment, the latch and/or the actuator may be linear push buttons, such that they move linearly rather than rotationally when contacted by a handle of the mobile computer.

Although the docking station of the type described above is considered to be particularly useful in relation to ruggedised tablet format mobile computers that use desktop operating systems, the present applicant envisages that the latching mechanism may nevertheless be utilised in relation to those tablet mobile computers that utilise a mobile operating system such as Android or iOS.

Whilst the present invention has been described and illustrated with reference to particular embodiments, it will be appreciated by those of ordinary skill in the art that the invention lends itself to many different variations not specifically illustrated herein. By way of example only, certain possible variations will now be described.

Where in the foregoing description, integers or elements are mentioned which have known, obvious or foreseeable equivalents, then such equivalents are herein incorporated as if individually set forth. Reference should be made to the claims for determining the true scope of the present invention, which should be construed so as to encompass any such equivalents. It will also be appreciated by the reader that integers or features of the invention that are described as preferable, advantageous, convenient or the like are optional and do not limit the scope of the independent claims. Moreover, it is to be understood that such optional integers or features, whilst of possible benefit in some embodiments of the invention, may not be desirable, and may therefore be absent, in other embodiments.

The invention claimed is:

1. A docking station module for a computer docking station, the docking station module comprising a latching mechanism, the latching mechanism comprising a latch moveable between an unlatched position and a latched position, a retainer moveable between a blocking position and an unblocked position, such that in the blocking position the retainer prevents movement of the latch to the unlatched position and in the unblocked position movement of the latch to the unlatched position is permitted, and an actuator for moving the retainer between the blocking and unblocked position, a connection surface, the connection surface configured to enable the docking station module to be connected to a docking station cradle, and wherein the latch is pivotable about an axis of the latching mechanism, such that rotary movement of the latch moves the latch between the latched and unlatched position; the docking station module configured to be removably connected to a docking station cradle.

2. A docking station module as claimed in claim 1, configured to be removably connected to variously sized docking station cradles.

3. A docking station module as claimed in claim 1, the retainer configured to block the motion of the latch.

4. A docking station module as claimed in claim 1, the actuator positioned forward of the latch, such that a computer first contacts the actuator and subsequently contacts the latch, when being brought into engagement with a docking station comprising the docking station module.

5. A docking station module as claimed in claim 1, the actuator positioned to axially overlap the latch.

6. A docking station module as claimed in claim 1, the actuator comprising an inclined surface.

7. A docking station module as claimed in claim 1, wherein the latch is resiliently biased.

8. A docking station module as claimed in claim 1, wherein the actuator is pivotable about an axis of the latching mechanism, such that rotary movement of the actuator moves the retainer to the unblocked position.

9. A docking station module as claimed in claim 1, wherein the actuator is pivotable about an axis of the latching mechanism, such that rotary movement of the actuator moves the retainer between the blocking and unblocked positions.

10. A docking station module as claimed in claim 1, wherein the latch and the actuator may be pivotable about a common axis.

11. A docking station module as claimed in claim 1, wherein, the docking station module comprises a latch release button for moving the retainer to the unblocked position so as to permit movement of the latch to the unlatched position.

12. A docking station module as claimed in claim 11, wherein the latch release button is configured to move along a longitudinal axis of the docking station module.

13. A docking station module as claimed in claim 1, wherein the latching mechanism is configured to engage with and restrict the movement of an external edge of a tablet computer.

14. A docking station module as claimed in claim 1, the connection surface configured to engage with a docking station cradle, at an opposite portion of the docking station cradle to a computer connection point.

15. A docking station module as claimed in claim 14, wherein the computer connection point comprises an electrical connection and one or more data connections.

16. A docking station, the docking station comprising a docking station module and a docking station cradle, the docking station module comprising a latching mechanism comprising a latch moveable between an unlatched position and a latched position, a retainer moveable between a blocking position and an unblocked position, such that in the blocking position the retainer prevents movement of the latch to the unlatched position and in the unblocked position movement of the latch to the unlatched position is permitted, and an actuator for moving the retainer between the blocking and unblocked position, a connection surface, the connection surface configured to enable the docking station module to be connected to a docking station cradle, the docking station module removably connected to the docking station cradle via the connection surface; and wherein the latch is pivotable about an axis of the latching mechanism, such that rotary movement of the latch moves the latch between the latched and unlatched position.

17. A docking station as claimed in claim 16, the docking station cradle comprising a base support for receiving the base of a tablet computer.

18. A docking station as claimed in claim 17, the docking station cradle comprising a rear support for supporting the rear of a tablet computer engaged with the docking station.

19. A docking station as claimed in claim 17, the base support arranged to be cupped, such that to place a tablet computer into engagement with the docking station, the base of the tablet computer is received in the base support and the tablet computer is tilted towards the actuator and the latch.

20. A docking station as claimed in claim 16, the docking station cradle comprising an electrical connection for connecting to the power supply of a tablet computer.

21. A docking station as claimed in claim 16, further comprising a lock, the lock being lockable to prevent release of the latch.

22. A docking station as claimed in claim 16, the docking station cradle configured to be mounted in a vehicle.

23. A docking station system, the docking station system comprising a docking station module, the docking station module comprising a latching mechanism comprising a latch moveable between an unlatched position and a latched position, a retainer moveable between a blocking position and an unblocked position, such that in the blocking position the retainer prevents movement of the latch to the unlatched position and in the unblocked position movement of the latch to the unlatched position is permitted, and an actuator for moving the retainer between the blocking and unblocked position, a connection surface, the connection surface configured to enable the docking station module to be connected to a docking station cradle, a first docking station cradle, and a second, different docking station cradle, the first docking station cradle configured for connection to the docking station module via the connecting surface to provide a first docking station, and the second docking station cradle configured for connection to the docking station module via the connecting surface to provide a second, different, docking station; and wherein the latch is pivotable about an axis of the latching mechanism, such that rotary movement of the latch moves the latch between the latched and unlatched position.

24. A docking station cradle, the docking station cradle comprising a first connecting surface, the first connecting surface configured to mate with a second connecting surface of a docking station module, the docking station module comprising:

a latching mechanism, the latching mechanism comprising a latch moveable between an unlatched position and a latched position, a retainer moveable between a blocking position and an unblocked position, such that in the blocking position the retainer prevents movement of the latch to the unlatched position and in the unblocked position movement of the latch to the unlatched position is permitted, and an actuator for moving the retainer between the blocking and unblocked position; and wherein the latch is pivotable about an axis of the latching mechanism, such that rotary movement of the latch moves the latch between the latched and unlatched position.

25. A method of manufacturing a docking station comprising:

selecting a docking station module, the docking station module including a latching mechanism with a latch moveable between an unlatched position and a latched position, a retainer moveable between a blocking position and an unblocked position, such that in the blocking position the retainer prevents movement of the latch to the unlatched position and in the unblocked position movement of the latch to the unlatched position is permitted, and an actuator for moving the retainer between the blocking and unblocked position, and a first connection surface and wherein the latch is pivotable about an axis of the latching mechanism, such that rotary movement of the latch moves the latch between the latched and unlatched position, selecting one of a plurality of docking station cradles having a second connecting surface, the second connecting surface configured to mate with the first connecting surface of the docking station module and connecting the docking station module to the docking station cradle.

\* \* \* \* \*